United States Patent [19]

Hsiung et al.

[11] Patent Number: 5,737,941
[45] Date of Patent: Apr. 14, 1998

[54] METHOD AND APPARATUS FOR REMOVING TRACE QUANTITIES OF IMPURITIES FROM LIQUIFIED BULK GASES

[75] Inventors: Thomas Hsiao-Ling Hsiung, Emmaus, Pa.; Jose Rui Souto Machado, San Jose, Calif.; Alexander Schwarz, Bethlehem, Pa.

[73] Assignee: Air Products and Chemicals, Inc., Allentown, Pa.

[21] Appl. No.: 786,576

[22] Filed: Jan. 21, 1997

[51] Int. Cl.⁶ .................................................. F25J 1/00
[52] U.S. Cl. ..................... 62/636; 62/50.2; 62/908; 95/106; 96/126
[58] Field of Search ............... 62/636, 908, 50.2; 96/126; 95/106

[56] References Cited

U.S. PATENT DOCUMENTS

| | | | |
|---|---|---|---|
| 4,312,669 | 1/1982 | Boffito et al. | 75/177 |
| 4,579,723 | 4/1986 | Weltmer et al. | 423/219 |
| 4,713,224 | 12/1987 | Tamhankar et al. | 423/219 |
| 4,717,406 | 1/1988 | Giacobbe | 62/908 |
| 4,839,085 | 6/1989 | Sandrock et al. | 252/181.6 |
| 4,869,883 | 9/1989 | Thorogood et al. | 423/219 |
| 4,943,304 | 7/1990 | Coe et al. | 55/66 |
| 5,106,339 | 4/1992 | Fisher | 62/22 |
| 5,194,233 | 3/1993 | Kitahara et al. | 423/210 |

FOREIGN PATENT DOCUMENTS 2045060  1/1992  Canada.

*Primary Examiner*—Ronald C. Capossela
*Attorney, Agent, or Firm*—Geoffrey L. Chase

[57] ABSTRACT

Method and apparatus for removing trace levels of impurities from gases stored cryogenically in a storage vessel in liquid form by passing a vaporized portion of liquified gas from the storage vessel through a bed of adsorbent while using the liquified gas to cool the adsorbent. Vaporized gas resulting from cooling of the adsorbent with the stored liquified gas can be combined with the vapor withdrawn from the storage vessel prior to being passed through the bed of adsorbent. Liquified gas can be withdrawn from the storage vessel, vaporized and the vaporized gas combined with the vaporized gas from the storage vessel prior to being passed through the bed of adsorbent.

15 Claims, 1 Drawing Sheet

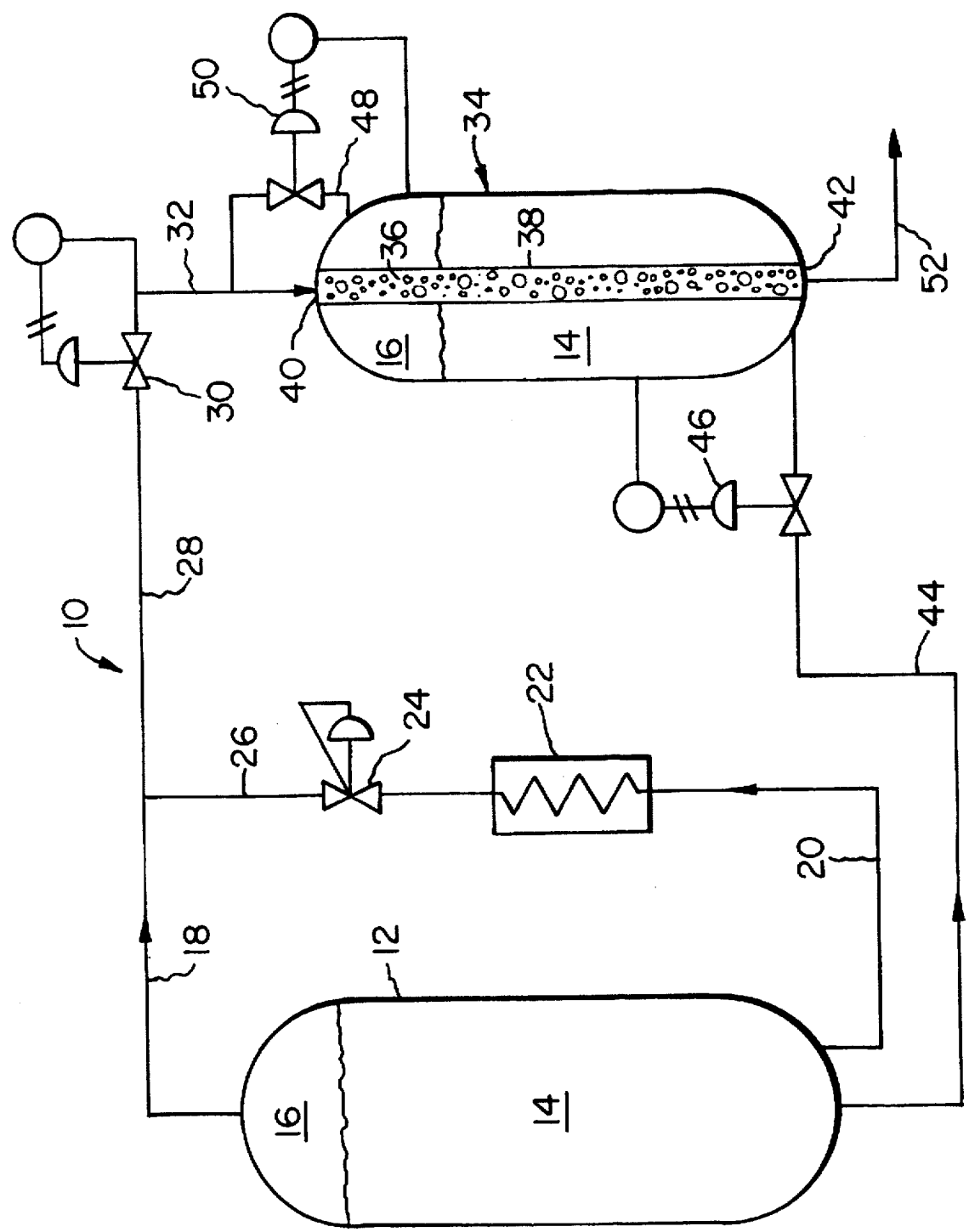

METHOD AND APPARATUS FOR REMOVING TRACE QUANTITIES OF IMPURITIES FROM LIQUIFIED BULK GASES

BACKGROUND OF THE INVENTION

The present invention pertains to removing trace levels of impurities from cryogenically produced gases normally stored as liquids.

In the manufacture of semiconductor devices, and in particular, advanced semiconductor devices with very small feature sizes, higher device density and larger chip sizes, a variety of industrial gases are used. The gases used include, inter alia, oxygen, hydrogen, nitrogen, argon and helium. The gases used must be processed to remove trace levels of impurities to yield ultra-high purity (UHP) product gas required by the user. In the semiconductor industry, nitrogen and argon are used as annealing and purge gases, hydrogen is employed in the crystal growth and epitaxy steps and oxygen is used in oxide formation and plasma etching. Because of the changing nature of the semiconductor devices there is an ever increasing demand for higher levels of purity of the gases used in the various manufacturing steps. In fact, by the year 2000 it is expected that the requirement for impurities in bulk gases used by the semiconductor industry will be less than 100 parts-per-trillion (ppt).

The level of impurity varies with the bulk gas. For example, standard purity argon usually contains traces of oxygen, nitrogen, methane, and moisture. Standard purity oxygen can contain nitrogen, argon, methane and moisture. To remove impurities from these gases in order to meet the standards for electronic bulk gases is an ever increasing challenge to the gas producer.

U.S. Pat. No. 5,106,399 discloses an argon purification system which utilizes an ambient temperature adsorption step wherein a molecular sieve is employed to remove $CO_2$, and $H_2O$, an ambient temperature chemisorption step where a nickel-based catalyst is used remove CO, $O_2$ and $H_2$, and a cryogenic temperature adsorption step wherein a Zeolite such as NaX is used to remove nitrogen and hydrocarbons.

A one-step process for purifying inert gas is disclosed in U.S. Pat. No. 4,713,224 wherein a nickel-based particulate material is used to remove minute quantities of CO, $CO_2$, $O_2$, $H_2$, and $H_2O$ from cryogenically produced gases.

U.S. Pat. No. 4,943,304 discloses use of synthetic chabazites for the selective adsorption of one or more constituents from a bulk gas stream.

U.S. Pat. No. 4,312,669 discloses a process of using a non-evaporable Cr-V-Fe gettering alloy for the sorption of water vapor without the release of $H_2$ at temperatures between 200° C. (392° F.) and 350° C. (662° F.). This ternary alloy can also be used in a wide temperature range for the adsorption of $H_2$, CO, and $CO_2$.

U.S. Pat. No. 4,839,085 discloses a method of manufacturing getters by means of hydrogen pulverization. The method permits the manufacture of porous getters of high zirconium content zirconium-vanadium alloys that have minor additions of iron, nickel, manganese and aluminum.

U.S. Pat. No. 5,194,233 discloses a process for purifying rare gases using non-evaporable getters with a binary alloy of zirconium and vanadium or an alloy of zirconium and vanadium with additions of at least one of chromium nickel and colbalt. According to patentees, the effective temperature range for these getters is from 350° C. (662° F.) to 700° C. (1292° F.).

U.S. Pat. No. 4,579,723 discloses a two-step method for purifying inert gas streams. Parts-per-million (ppm) levels of impurities such as $O_2$, CO, $H_2$, $CO_2$, and water can be removed from the inert gas stream by passing the stream through beds of reactive/adsorbent material and ambient temperatures up to 38° C. The first bed is packed with a catalyst which converts CO and $H_2$ to $CO_2$ and $H_2O$ via oxidation reactions with oxygen. Water is trapped in the first bed. The remaining gas stream is supplied to a second bed of getter material which material is effective to react with oxygen in the inert gas stream and to trap $CO_2$.

U.S. Pat. No. 4,869,883 discloses a three-step method for bulk nitrogen purification. In the first step, the oxygen present in the bulk nitrogen reacts with CO and $H_2$ over copper-based catalyst to form $CO_2$ and $H_2O$. The residual CO and $H_2$ react further in the second step with a packed bed of CuO to once again form $CO_2$ and $H_2$ O. In the third step, $CO_2$ and $H_2O$ are removed by adsorption on a molecular sieve adsorbent.

Canadian Patent Application 2 045 060 suggests removal of CO, $CO_2$, $O_2$, $H_2$, and $H_2O$ from an inert gas stream using a three-bed arrangement. In the first bed a transition metal oxide such as a composition containing copper and manganese oxides, sold under the designation Hopcalite by Mine Safety Appliances, causes conversion of CO to $CO_2$. A palladium/alumina (Pd/Al$_2$O$_3$) catalyst in the second bed converts $H_2$ to $H_2$ O and the third bed contains an adsorbent, e.g. a Cu/Al$_2$O$_3$ sold under the designation Dow Q-5 by the Dow Chemical Company. The adsorbent chemically adsorbs CO, $O_2$ and water from the feed stream. According, to the patent application all three beds operate at temperatures as low as −30° C. (−22° F.).

BRIEF SUMMARY OF THE INVENTION

The present invention pertains to a method and apparatus for removing trace levels of impurities from gases normally stored in liquified from in bulk utilizing the refrigeration value of the liquified gas to cool a bed of adsorptive material to take advantage of higher adsorption capacity at low temperatures.

The apparatus according to the invention consists of a treatment vessel for holding an adsorbent of the type that will remove trace impurities from the stored gas, the vessel includes means to cool the adsorbent bed with liquid withdrawn from the normal storage vessel and put in contact with the adsorbent bed by direct heat exchange. Vaporized gas from the storage vessel is withdrawn and conducted through the adsorbent bed wherein trace impurities are removed. After heat exchange with the adsorbent bed vaporized gas can be removed from the treatment vessel and included as the feed stream to the adsorbent bed for purification. Additional gas for the feed stream to the adsorbent bed is taken from a vaporizer used to vaporize stored liquified gas.

The method according to the invention separates trace impurities from gas withdrawn as a vapor from a vessel wherein the gas is stored in liquid form by establishing a bed of adsorbent capable of removing the trace impurities, moving the gas to be treated through the adsorbent bed while utilizing liquified gas withdrawn from the vessel to cool the adsorbent bed.

BRIEF DESCRIPTION OF THE SEVERAL VIEWS OF THE DRAWINGS

The single FIGURE of the drawing is schematic representation of the method and apparatus according to the present invention.

DETAILED DESCRIPTION OF THE INVENTION

In order to produce an ultra-high purity gas for use by semiconductor manufacturers, industrial gas producers rely on well known cryogenic processes to produce the gas in liquid form. Cryogenic separation or distillation processes used to produce oxygen, nitrogen, argon and hydrogen are well known and result in a product that has a high purity level. However, even the production of the gases by cryogenic techniques results in trace impurities in the gas. For example, standard purity argon usually contains trace amounts of oxygen, nitrogen, methane and moisture and standard purity oxygen contains trace amounts of nitrogen, argon, methane and moisture.

Titanium-based alloys or zirconium-based alloys are the most common among getter materials for use with non-evaporable getter purifiers for producing UHP gases. Nitrogen, hydrocarbons, carbon monoxide, carbon dioxide, oxygen, hydrogen, and water can be removed at elevated temperatures by using these types of getters. When a titanium-based getter is employed, it is necessary to maintain the getter at a temperature as high as 1,000° C. (1832° F.) in order for it to be effective. Materials of construction and safety become a challenge and purification methods using titanium-based alloys have been decreasing. On the other hand zirconium-based alloys are more popular because they can be operated at lower temperatures, e.g. 1° C. (33.8° F.).

However, non-evaporable getters have some disadvantages. One of the major disadvantages is regenerability since most of the getter capacity cannot be regenerated after use and the getter has to be replaced after the capacity is depleted. They are, in general, operated at elevated temperatures, eg. above 200° C., (392° F.) usually around 400° C., (752° F.) which adds to operating cost. Getter materials are very expensive.

On the other hand, it is desirable to remove trace elements from the cryogenically produced gases without the need for elevated temperatures and expensive gettering materials.

According to the present invention removal of trace elements (unwanted species) from cryogenically produced gases can be accomplished with a method and apparatus shown in FIG. 1. The purification system or purifier 10 of FIG. 1 includes a cryogenic storage vessel 12 which includes an inventory of liquefied gas 14 and an inventory of vaporized gas 16. Cryogenic storage vessels (tanks) for holding large quantities of liquefied gases such as nitrogen, argon, helium, oxygen, and hydrogen are well known in the art.

As shown in FIG. 1 vaporized gas is drawn from the overhead portion of the storage vessel 12 by means of a conduit 18. Additional gas can be made available by withdrawing liquid from storage vessel 12 by a conduit 20 passing the liquid through a heat exchanger 22, regulator 24 and into a conduit 26 which joins with conduit 18 to form a delivery or supply conduit 28. The gas in conduit 28 passes through an automatic control valve 30 into conduit 32 and into a treatment or adsorbent vessel 34. Treatment vessel 34 contains an adsorbent bed 36 which can be contained in a tube 38 making the treatment vessel 34 a tube-and-shell arrangement. The adsorbent bed can extend from a first end 40 to a second end 42 of treatment vessel 34. Treatment vessel 34 is adapted to receive liquefied gas from storage vessel 12 by a conduit 44 and liquid level controller 46. The liquid 14 in treatment vessel 34 is adapted to cool the catalyst bed 36 by heat exchange resulting in vaporized gas 16 contained in the top or head space in the treatment vessel 34. Vaporized gas 16 in the head space of treatment vessel 34 can be removed through conduit 48 and valve 50 and introduced into conduit 32 as part of the feed stream to the treatment (purification) vessel 34. The product exiting treatment vessel 34 through a conduit 52 would be an ultra-high purity gas wherein the trace quantities have been drawn down to levels below parts-per-billion (ppb).

The purification vessel 34 can be an integral part of the bulk gas delivery system so that the customer who normally has a cryogenic storage tank 12 on site can have a supply of ultra-high purity gas. All of the impurities can be removed in a single treatment (purification) vessel and, depending upon the bulk gas, impurities that can be removed include carbon monoxide, carbon dioxide, oxygen, nitrogen, methane and water. Hydrogen content in liquified oxygen, argon or nitrogen is quite low (eg. less than 20 ppb), and therefore is not a major concern. The bulk gases to be purified need not be inert gases. Thus, in addition to nitrogen, argon, and helium the method and apparatus of the present invention can be tailored for use with oxygen and hydrogen delivery purification systems.

Preferably, the purification system will have two identical treatment vessels 34 arranged in parallel, with one treatment vessel performing purification while the other vessel is undergoing regeneration. Each vessel 34 is loaded with adsorbents that can remove specific impurities of interest. The treatment vessel 34 can be operated at cryogenic temperatures to take advantage of higher adsorption capacity at lower temperatures. Thus, the purifier can use the cooling capacity available from the liquefied gas to chill the adsorbent bed to a desirable temperature. Regeneration can be accomplished by either warming the adsorbent up to ambient temperature or by a vacuum evacuation.

Furthermore, depending upon the impurities to be removed, the adsorber bed 38 can be packed with more than one type adsorbent necessary to purify the incoming gas stream. For example, if a typical liquified bulk argon contains ppm levels of oxygen, nitrogen, and methane an adsorber bed packed with a layer of molecular sieve 4A and a layer of calcium-chabazite can effectively remove the impurities to levels in the low ppm range at a temperature of minus 200° F. (−129° C.) or lower.

The following examples illustrate the present invention.

EXAMPLE 1

An argon stream containing ppm levels of oxygen nitrogen and methane can be purified by a packed bed of synthetic Ca-chabazite with a Si/Al ratio of approximately 2. The packed bed is operated at a temperature of about minus 215° F. (−137° C.) resulting in impurities removed to below a detection limit of 10 ppb.

EXAMPLE 2

An argon stream containing ppm levels of $O_2$ $N_2$ $CH_4$ and $CO_2$ is purified by using a packed bed by of two adsorptive materials. The first layer can be BPL activated carbon sold by Calgon Corporation and the second layer the same calcium chabazite used in Example 1. The absorber is operated at −215° F. (−137° C.). In this process carbon dioxide is retained in the first layer and the rest of the impurities are removed in the second layer. Regeneration of this type of bed can be accomplished with an argon purge at ambient temperatures.

EXAMPLE 3

A hydrogen gas containing low ppm levels of $CH_4$, $O_2$, $N_2$, and $CO_2$ can be purified with the same process and apparatus used in Example 2.

EXAMPLE 4

Oxygen gas containing low ppm levels of nitrogen, methane and CO can be purified with a single calcium chabazite bed at a temperature of −250° F. (−157° C.).

EXAMPLE 5

An Argon stream containing 1.1 ppm $H_2$, 1.3 ppm $N_2$, and 1.2 ppm $CH_4$ was passed through a packed bed of TOSOH SA–600 CaX adsorbent at about −213° F., both the $N_2$ and $CH_4$ were removed to below the detectable limit of 10 ppb but the $H_2$ was not removed.

The present invention offers a simple method of purifying liquefied bulk gases in a single vessel at cryogenic temperatures by taking advantage of the cooling potential available from the liquefied bulk gas. In addition, the bulk gases to be purified do not have to be inert gases. Oxygen and hydrogen can be purified using the method and apparatus of the present invention. Moreover, the adsorption bed can be packed with a single adsorbent or layers of different adsorbents.

Regeneration can be achieved by warming the temperature or using vacuum temperature or using vacuum evacuation to minimize the purge requirement the processes used to regenerate nickel or copper based adsorbents, no hydrogen is needed in the regeneration of adsorbents that can be used with the method and apparatus of the invention. Metal getter based purifiers, on the other hand, cannot be conveniently regenerated and the purifier beds have to be replaced periodically.

According to the present invention care must be taken in choosing adsorbents. U.S. Pat. No. 4,943,304 discloses a divalent cation-containing chabazite having a Si/Al ratio of 1.8 to 2.7 which is a superior adsorbent for the purification of bulk gases. Calcium-chabazite, especially synthesized chabazite with a proper silicon to a aluminum ratio shows excellent capacity for oxygen, nitrogen, carbon monoxide, methane, carbon dioxide and water contained in cryogenically produced argon. Calcium chabazite is also found to be effective in removing trace amounts of nitrogen, methane, carbon dioxide, and water from bulk quantities of oxygen and hydrogen. Deactivation is not a concern when these materials are used with bulk quantities of oxygen or hydrogen. On the other hand, both nickel and copper based adsorbents cannot be used for oxygen and hydrogen purification. Neither can they remove nitrogen and methane from argon or helium at low temperatures.

Calcium chabazite is effective in removing $CO_2$ and water from bulk gases, however this material requires regeneration at high temperatures, eg >300° C. (572° F.), to desorb these impurities and recover the capacity of the calcium chabazite. Therefore, it may be more cost effective to use a layered bed arrangement with the first layer material being molecular sieve followed by a layer of calcium chabazite. In this arrangement the molecular sieve will retain carbon dioxide and water and the remaining impurities, eg oxygen, nitrogen, carbon monoxide, and methane will be removed by the calcium chabazite. In this process regeneration can be accomplished at ambient temperatures.

Other adsorbents can also be used in this invention. Depending upon the application, molecular sieve 4A can be used to separate oxygen from argon in a kinetic separation mode under cryogenic temperatures. Activated carbon can be used to remove carbon dioxide and water from bulk gases such as argon and nitrogen. NaX, CaA or CaX can be effective in temperature ranges from −150° C. (−238° F.) to −180° C. (−292° F.) as set forth in U.S. Pat. No. 5,106,399.

Having thus described our invention, what is desired to be secured by letters patent of the United States is set forth in the appended claims.

We claim:

1. An apparatus for removal of trace impurities from bulk quantities of gases stored in a storage vessel wherein there is a quantity of liquified gas and a quantity of vaporized gas comprising in combination:

a treatment vessel for holding an adsorbent, said adsorbent of the type to remove said trace impurities from the stored gas; said vessel including means to cool said adsorbent by contact with said stored liquified gas, and means to withdraw vaporized gas from said treatment vessel and introduce said vaporized gas into said adsorbent;

means to withdraw liquified gas from said storage vessel and introduce it into said treatment vessel;

means to withdraw vaporized gas from said storage vessel and introduce said vaporized gas into said adsorbent; and means to deliver vaporized gas from said adsorbent to a point of use.

2. An apparatus according to claim 1 wherein said adsorbent is contained in a jacketed tube.

3. An apparatus according to claim 2 including means to introduce liquified gas into said jacket.

4. An apparatus according to claim 1 including means to withdraw liquified gas from said storage vessel, vaporize said withdrawn liquified gas and introduce said vaporized liquified gas into said adsorbent.

5. An apparatus according to claim 1 wherein said adsorbent is disposed in a packed bed array.

6. An apparatus according to claim 5 wherein said bed contains alternate layers of different adsorbents.

7. An apparatus according to claim 1 wherein said adsorbent is a bed of activated carbon.

8. An apparatus according to claim 1 wherein said adsorbent is a bed of Ca-chabazite.

9. An apparatus according to claim 1 wherein said adsorbent is in a bed being alternate layers of activated carbon and Ca-chabazite.

10. A method for separating trace impurities from gas withdrawn as vapor from a vessel where the gas is stored in liquid form comprising the steps of:

establishing a bed of adsorbent capable of removing said trace impurities from said gas;

conducting said gas through said bed of adsorbent; and utilizing liquified gas withdrawn from said vessel to cool said bed of adsorbent.

11. A method according to claim 10 including the steps of removing gas vaporized during cooling of said bed of adsorbent and including said removed vaporized gas with gas withdrawn as vapor from said vessel prior to said step of conducting said gas through said bed of adsorbent.

12. A method according to claim 10 including the steps of withdrawing liquified gas from a storage vessel and passing said liquid through a vaporizer, removing vaporized gas from said vaporizer and combining said removed vaporized gas with gas withdrawn as vapor from a treatment vessel containing said bed of adsorbent prior to said step of conducting said gas through said bed of adsorbent.

13. A method according to claim 10 including the step of passing said gas through an automatic control valve before conducting said gas through said bed of adsorbent.

14. A method according to claim 10 including the step of establishing said bed in alternate layers of activated charcoal and Ca-chabazite.

15. A method according to claim 10 including the step of withdrawing as a product stream ultra-high purity gas from an exit end of said bed of adsorbent.

\* \* \* \* \*